(12) United States Patent
Savolainen

(10) Patent No.: US 9,143,389 B2
(45) Date of Patent: Sep. 22, 2015

(54) METHODS, APPRATUSES, AND COMPUTER PROGRAM PRODUCTS FOR DETERMINING A NETWORK INTERFACE TO ACCESS A NETWORK RESOURCE

(75) Inventor: Teemu Ilmari Savolainen, Nokia (FI)

(73) Assignee: Nokia Technologies Oy, Espoo (FI)

(*) Notice: Subject to any disclaimer, the term of this patent is extended or adjusted under 35 U.S.C. 154(b) by 578 days.

(21) Appl. No.: 13/124,647

(22) PCT Filed: Oct. 15, 2008

(86) PCT No.: PCT/IB2008/054239
§ 371 (c)(1),
(2), (4) Date: Apr. 15, 2011

(87) PCT Pub. No.: WO2010/043929
PCT Pub. Date: Apr. 22, 2010

(65) Prior Publication Data
US 2011/0225284 A1    Sep. 15, 2011

(51) Int. Cl.
*H04L 29/12* (2006.01)
(52) U.S. Cl.
CPC ...... *H04L 29/12066* (2013.01); *H04L 61/1511* (2013.01)
(58) Field of Classification Search
CPC .................................................. H04L 29/12066
USPC ........................................................ 709/223
See application file for complete search history.

(56) References Cited

U.S. PATENT DOCUMENTS

| | | | |
|---|---|---|---|
| 6,480,508 B1* | 11/2002 | Mwikalo et al. | 370/475 |
| 7,308,703 B2* | 12/2007 | Wright et al. | 726/1 |
| 7,917,616 B2* | 3/2011 | Trace et al. | 709/224 |
| 8,005,981 B2* | 8/2011 | Tuck et al. | 709/238 |
| 8,305,933 B2* | 11/2012 | Aboughanaima et al. | 370/254 |
| 2007/0014241 A1 | 1/2007 | Banerjee et al. | |
| 2007/0192303 A1* | 8/2007 | Stojancic | 707/3 |
| 2008/0004051 A1* | 1/2008 | Sylvain | 455/466 |
| 2010/0265846 A1* | 10/2010 | Weniger | 370/254 |
| 2012/0158969 A1* | 6/2012 | Dempsky et al. | 709/226 |

FOREIGN PATENT DOCUMENTS

| | | |
|---|---|---|
| CN | 1564551 A | 1/2005 |
| CN | 1984155 A | 6/2007 |
| WO | WO-2004072798 A2 | 8/2004 |

OTHER PUBLICATIONS

PCT International Search Report dated Aug. 5, 2009, for PCT application No. PCT/IB2008/054239.

* cited by examiner

*Primary Examiner* — Anh-Vu Ly
*Assistant Examiner* — Abdullahi Ahmed
(74) *Attorney, Agent, or Firm* — Mintz Levin Cohn Ferris Glovsky and Popeo, P.C.

(57) ABSTRACT

A method, apparatus, and computer program product are provided for determining a network interface to network resource. An apparatus may comprise a processor configured to receive a request for resolution of a domain name. The processor may be further configured to access maintained domain name suffix information. The maintained domain name suffix information may comprise a plurality of domain name suffix entries. The processor may additionally be configured to search the maintained domain name suffix information for one or more domain name suffix entries corresponding to the domain name to determine one or more network interfaces through which the domain name is accessible. The processor may also be configured to select a network interface for resolving the domain name into a network address from the one or more determined network interfaces.

11 Claims, 11 Drawing Sheets

# METHODS, APPRATUSES, AND COMPUTER PROGRAM PRODUCTS FOR DETERMINING A NETWORK INTERFACE TO ACCESS A NETWORK RESOURCE

RELATED APPLICATION

This application was originally filed as PCT Application No. PCT/IB2008/054239 filed Oct. 15, 2008.

TECHNOLOGICAL FIELD

Embodiments of the present invention relate generally to mobile communication technology and, more particularly, relate to methods, apparatuses, and computer program products for determining a network interface to access a network resource.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies as well as evolved computing devices making use of networking technologies continue to facilitate ease of information transfer and convenience to users. Many computing devices are now configured to access network resources, such as, for example, web pages, over a plurality of available network interfaces. These network interfaces may include, for example, cellular network interface, a wired Ethernet interface, a wireless local access network interface, a virtual private network tunnel interface, and/or the like. These available network interfaces may interface with wireline or wireless networks.

Some network resources, however, may not be accessible through each available network interface. Moreover, even if a network resource is available through multiple available network interfaces, one available network interface may be better for accessing the network resource than others. Unfortunately, applications, such as web browsers, used to access network resources and/or applications used to control access to network resources by other applications, such as various operating system components, may not be configured to determine an appropriate network interface for use to access a network resource. These applications may be configured to only use a predefined network interface or may otherwise be configured to blindly cycle through available network interfaces. Some applications may require user intervention to switch a default network interface. However, this is undesirable from a usability point of view as not only does it impose a burden on the user, but the user may not know which network interface to use.

Accordingly, it may be advantageous to provide computing device users with methods, apparatuses, and computer program products for determining a network interface to access a network resource.

BRIEF SUMMARY OF SOME EXAMPLES OF THE INVENTION

A method, apparatus, and computer program product are therefore provided for determining a network interface to access a network resource. In this regard, a method, apparatus, and computer program product may be provided that may provide several advantages to a user of a computing device. Embodiments of the invention may provide for maintaining domain name suffix information, which may indicate what domain names may be accessed and/or resolved over a network interface, which cannot be resolved over a network interface, and/or a preference level to which the network interface is preferred for accessing and/or resolving a domain name. Accordingly, an appropriate network interface may be selected for resolving a domain name and connecting to the associated network address. Selection of an appropriate network address may result in fewer errors that would otherwise result from attempting to resolve a domain name over a network interface through which the domain name cannot be resolved. Accordingly, users of host devices, such as a user of a web browser, may benefit from experiencing fewer connectivity errors from failed attempts to resolve domain names. Further, in some embodiments, a network interface may be selected according to defined priority levels, which may take into account trust level, speed, and/or cost of available network interfaces when selecting a network interface. Accordingly, end users may benefit from embodiments that select a secure and/or efficient network interface.

In a first exemplary embodiment, a method is provided, which may include receiving a request for resolution of a domain name. The method may further include accessing maintained domain name suffix information. The maintained domain name suffix information may comprise a plurality of domain name suffix entries. Each domain name suffix entry may comprise a domain name suffix and may indicate accessibility of a domain name corresponding to the domain name suffix over a network interface. The method may additionally include searching the maintained domain name suffix information for one or more domain name suffix entries corresponding to the domain name to determine one or more network interfaces through which the domain name is accessible. The method may also include selecting a network interface for resolving the domain name into a network address from the one or more determined network interfaces.

In another exemplary embodiment, a computer program product is provided. The computer program product includes at least one computer-readable storage medium having computer-readable program instructions stored therein. The computer-readable program instructions may include a plurality of program instructions. Although in this summary, the program instructions are ordered, it will be appreciated that this summary is provided merely for purposes of example and the ordering is merely to facilitate summarizing the computer program product. The example ordering in no way limits the implementation of the associated computer program instructions. The first program instruction is for receiving a request for resolution of a domain name. The second program instruction is for accessing maintained domain name suffix information. The maintained domain name suffix information may comprise a plurality of domain name suffix entries. Each domain name suffix entry may comprise a domain name suffix and may indicate accessibility of a domain name corresponding to the domain name suffix over a network interface. The third program instruction is for searching the maintained domain name suffix information for one or more domain name suffix entries corresponding to the domain name to determine one or more network interfaces through which the domain name is accessible. The fourth program instruction is for selecting a network interface for resolving the domain name into a network address from the one or more determined network interfaces.

In another exemplary embodiment, an apparatus is provided, which may include a processor configured to receive a request for resolution of a domain name. The processor may be further configured to access maintained domain name suffix information. The maintained domain name suffix information may comprise a plurality of domain name suffix entries. Each domain name suffix entry may comprise a domain name suffix and may indicate accessibility of a domain name corresponding to the domain name suffix over a network interface. The processor may additionally be configured to search the maintained domain name suffix information for one or more domain name suffix entries corresponding to the domain name to determine one or more network interfaces through which the domain name is accessible. The processor may also be configured to select a network interface for resolving the domain name into a network address from the one or more determined network interfaces.

In another exemplary embodiment, an apparatus is provided that may include means for receiving a request for resolution of a domain name. The apparatus may further include means for accessing maintained domain name suffix information. The maintained domain name suffix information may comprise a plurality of domain name suffix entries. Each domain name suffix entry may comprise a domain name suffix and may indicate accessibility of a domain name corresponding to the domain name suffix over a network interface. The apparatus may also include means for searching the maintained domain name suffix information for one or more domain name suffix entries corresponding to the domain name to determine one or more network interfaces through which the domain name is accessible. The apparatus may additionally include means for selecting a network interface for resolving the domain name into a network address from the one or more determined network interfaces.

In another exemplary embodiment, a method is provided that may include maintaining domain name suffix information. The maintained domain name suffix information may comprise a plurality of domain name suffix entries. Each domain name suffix entry may comprise a domain name suffix and may indicate accessibility of a domain name corresponding to the domain name suffix over a network interface. The method may further include sending a request for domain name suffix information to a network management entity. The method may additionally include receiving domain name suffix information from the network management entity. The method may also include updating the maintained domain name suffix information based at least in part upon the received domain name suffix information.

In another exemplary embodiment, a computer program product is provided. The computer program product includes at least one computer-readable storage medium having computer-readable program instructions stored therein. The computer-readable program instructions may include a plurality of program instructions. Although in this summary, the program instructions are ordered, it will be appreciated that this summary is provided merely for purposes of example and the ordering is merely to facilitate summarizing the computer program product. The example ordering in no way limits the implementation of the associated computer program instructions. The first program instruction is for maintaining domain name suffix information. The maintained domain name suffix information may comprise a plurality of domain name suffix entries. Each domain name suffix entry may comprise a domain name suffix and may indicate accessibility of a domain name corresponding to the domain name suffix over a network interface. The second program instruction is for sending a request for domain name suffix information to a network management entity. The third program instruction is for receiving domain name suffix information from the network management entity. The fourth program instruction is for updating the maintained domain name suffix information based at least in part upon the received domain name suffix information.

In another exemplary embodiment, an apparatus is provided, which may include a processor configured to maintain domain name suffix information. The maintained domain name suffix information may comprise a plurality of domain name suffix entries. Each domain name suffix entry may comprise a domain name suffix and may indicate accessibility of a domain name corresponding to the domain name suffix over a network interface. The apparatus may be further configured to send a request for domain name suffix information to a network management entity. The apparatus may additionally be configured to receive domain name suffix information from the network management entity. The apparatus may also be configured to update the maintained domain name suffix information based at least in part upon the received domain name suffix information.

The above summary is provided merely for purposes of summarizing some example embodiments of the invention so as to provide a basic understanding of some aspects of the invention. Accordingly, it will be appreciated that the above described example embodiments are merely examples and should not be construed to narrow the scope or spirit of the invention in any way. It will be appreciated that the scope of the invention encompasses many potential embodiments, some of which will be further described below, in addition to those here summarized.

BRIEF DESCRIPTION OF THE DRAWING(S)

Having thus described embodiments of the invention in general terms, reference will now be made to the accompanying drawings, which are not necessarily drawn to scale, and wherein:

DETAILED DESCRIPTION

Figure 1:
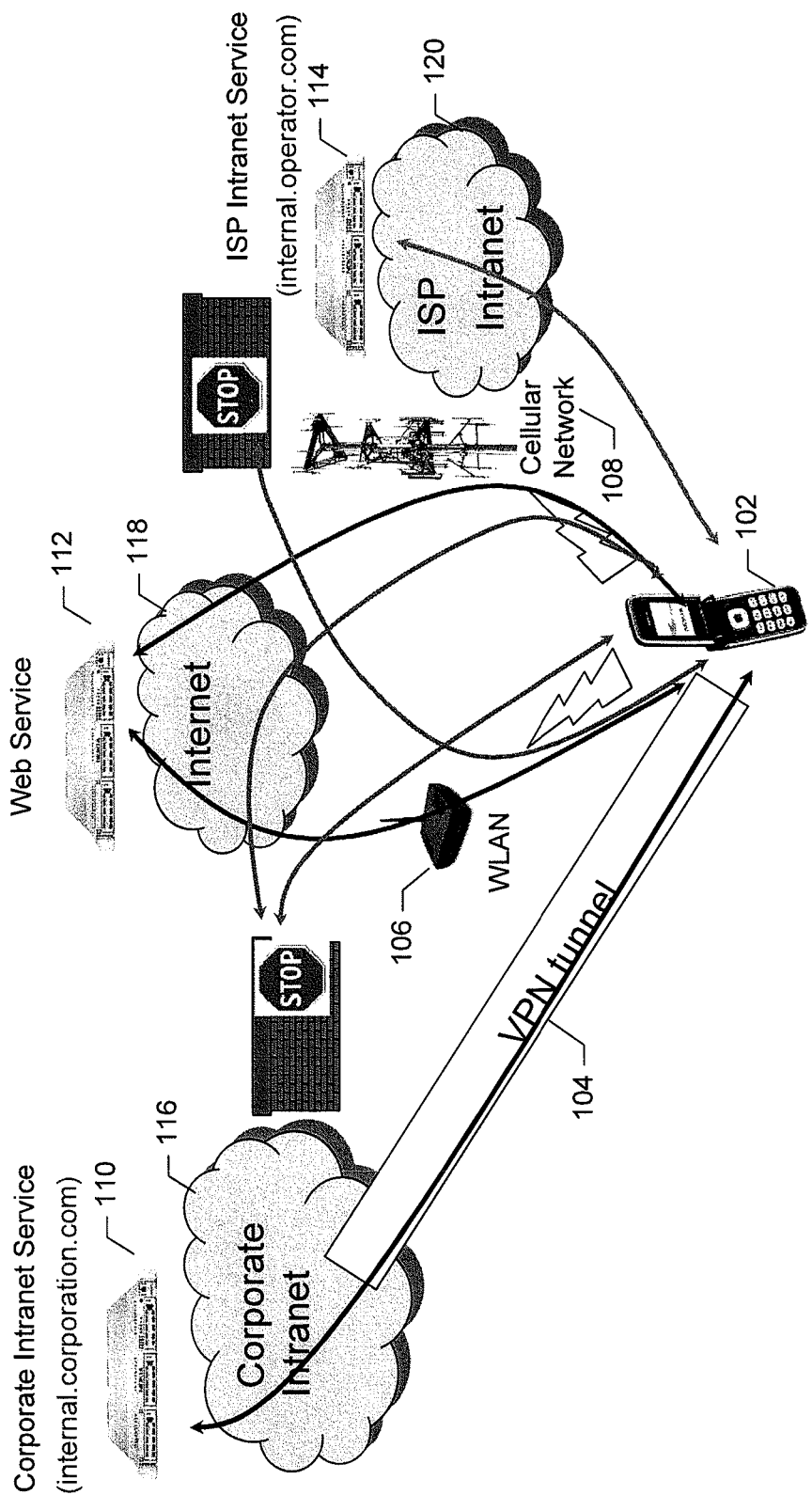
FIGS. 1-2 illustrate a computing device with multiple network interfaces, some of which provide exclusive access to certain network resources.

Some embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

As used herein, a "network interface" refers to a communication interface embodied on a computing device for accessing a network resource over a network connection. A "network resource" may comprise any computing device that may be accessed over a network, data that may be accessed from a networked computing device, and/or the like. The network interface may be embodied in hardware, software, firmware, or some combination thereof and thus may comprise a physical hardware interface or a virtual software interface. A network interface may be configured to provide access to a wireline network connection, wireless network connection, or some combination thereof.

A "network address" as used herein refers to a logical network layer address uniquely identifying a computing device on a network that may be used to send data to and/or receive data from the computing device over the network. From time to time, an Internet Protocol (IP) address will be used as an example of a network address. It will be appreciated, however, that where the term IP address is used, it is used merely for purposes of providing an illustrative example and accordingly other types of network addresses may be substituted within the scope of the invention.

A "domain name" as used herein refers to a name for a network resource, such as, for example, a server, web page, and/or the like, that may be correlated with a network address and thus resolved, or translated, to a network address so that the network resource referred to by the domain name may be accessed. In this regard, a domain name may provide a simple user-friendly reference to a network resource, e.g., www.nokia.com, in lieu of a full network address that may have a greater complexity, e.g., 147.243.3.83. From time to time, domain names in accordance with Internet Uniform Resource Locator (URL) conventions, e.g., www.nokia.com, will be used as an example of a domain name. It will be appreciated, however, that where such URLs are used, it is used merely for purposes of providing an illustrative example and accordingly other types of domain names may be substituted within the scope of the invention. Sometimes the term "fully qualified domain name (FQDN)" will be used herein and refers to an unambiguous domain name that specifies the exact location in a domain name system's tree hierarchy through to a top level domain and finally to a root domain (e.g., "www.nokia.com" rather than simply "nokia.com").

As used herein, a "domain name suffix" refers to a portion of a domain name and may include wildcard characters, such as, for example, an "*", substituted for omitted portions of the domain name. Examples of domain name suffixes include "*.corporation.com", "*.intranet.corporation.com", and "*.*". In this regard, a domain name suffix may correspond to one or more domain names that include the domain name suffix.

A "network management entity" as used herein refers to a computing device configured to manage access to a network by a host device. In this regard, a network management entity may be regarded as a network resource. In some embodiments, a network management entity may be configured to resolve a domain name into a network address. In this regard, a network management entity may be configured to receive a resolution request comprising a domain name from a host device, look up the domain name in a database to determine a corresponding network address, and provide the determined network address to the host device. Sometimes, the term domain name system (DNS) or DNS server will be used as an example of a network management entity. It will be appreciated, however, that where DNS and/or DNS server are used, it is used merely for purposes of providing an illustrative example and accordingly other types of network management entities may be substituted within the scope of the invention.

In some embodiments, a network management entity may be configured to assign a network address to a host device that the host device may use to access a network resource over a network. Sometimes, the term dynamic host configuration protocol (DHCP) server will be used as an example of such an embodiment of a network management entity. It will be appreciated, however, that where DHCP server is used, it is used merely for purposes of providing an illustrative example and accordingly other types of network management entities may be substituted within the scope of the invention.

Referring now to FIG. 1, which is illustrative of a problem that may be solved by embodiments of the present invention, FIG. 1 illustrates a computing device with multiple network interfaces, some of which provide exclusive access to certain network resources. In this regard, the computing device 102 may be a mobile terminal comprising a plurality of network interfaces. A first network interface may be the virtual private network (VPN) tunnel 104. A second network interface may be a wireless network interface through the wireless local area network (WLAN) 106. A third network interface may be cellular network interface through the cellular network 108. The VPN tunnel 104 may provide access to the corporate intranet service 110 over the corporate intranet 116 and a web service 112 over the internet 118, but may not provide access to the internet service provider (ISP) intranet service 114 over the ISP intranet 120. The WLAN 106 may provide access to the web service 112 over the internet 118, but may not provide access to the corporate intranet service 110 or the ISP intranet service 114. The cellular network 108 may provide access to the ISP intranet service 114 over the ISP intranet 120 and the web service 112 over the internet 118, but may not provide access to the corporate intranet service 110. Even those network interfaces providing access to multiple types of network resources may not be the best available network interface for accessing all of the network resources available over the network interface. For example, the cellular network interface 108, may not provide optimum access to the web service 112 compared to the WLAN interface 106, which may provide faster and/or cheaper access. Accordingly, a problem for the computing device 102 that may be addressed by embodiments of the present invention is determining which available network interface to use to access a network resource.

Figure 2:
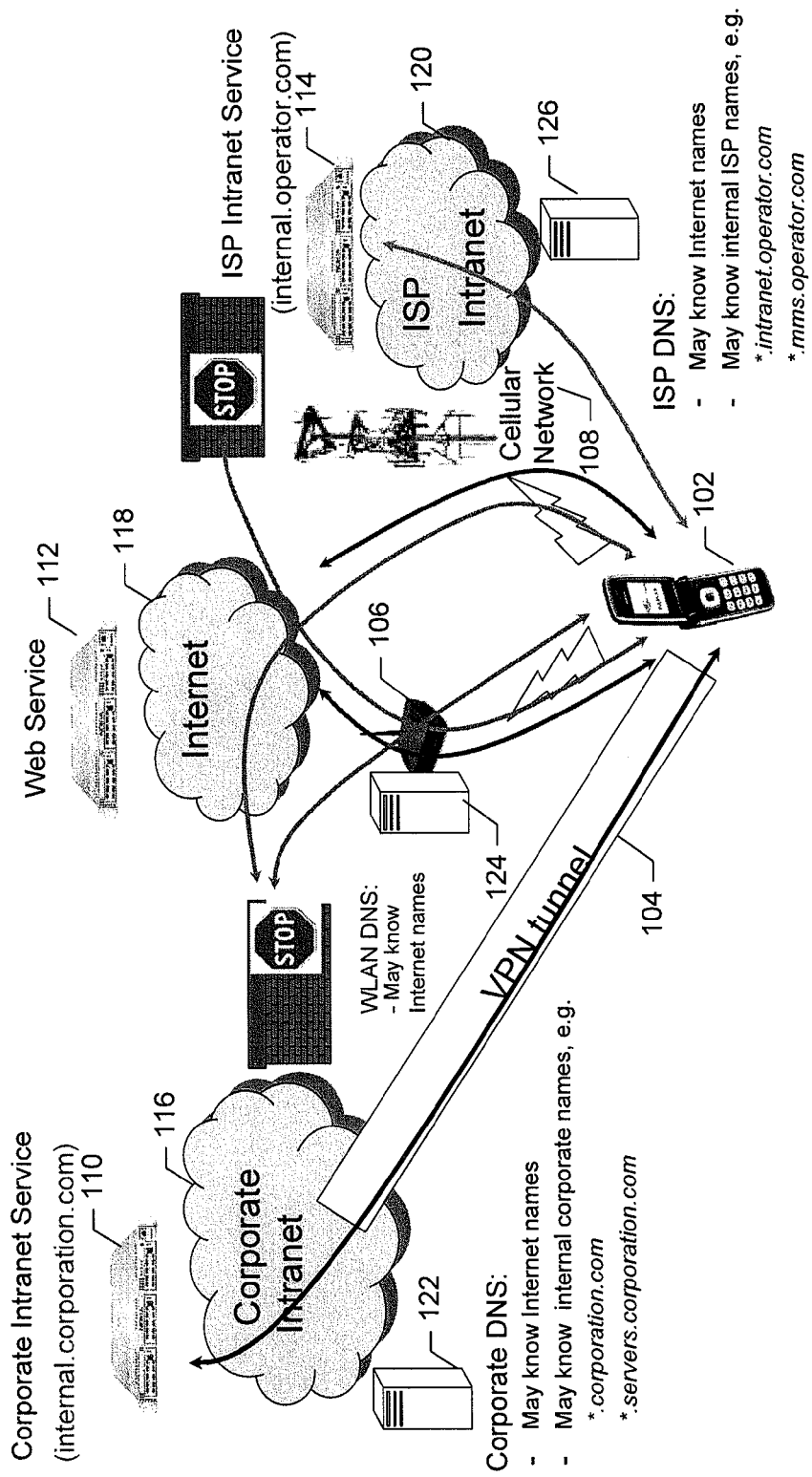

FIG. 2 illustrates another problem that may be solved by embodiments of the present invention. In this regard, a network management entity may be accessed through each network interface, e.g., the corporate DNS server 122 over the VPN tunnel 104, the WLAN DNS server 124 over the WLAN interface 106, and the ISP DNS server 126 over the cellular network interface 108. However, each of the network management entities may be configured to resolve only certain domain names. For example, the corporate DNS 122 may know only internet domain names and internal corporate domain names. The WLAN DNS 124 may know only internet domain names. The ISP DNS 126 may know only internet names and internal ISP domain names. In this regard, FIG. 2 illustrates a concept referred to as split horizon DNS wherein certain domain names may be translated into a network address only by a certain DNS server. Accordingly, a problem for the computing device 102 that may be addressed by embodiments of the present invention is determining which network management entity and thus which available network interface to use to resolve a domain name so that the computing device 102 may access a network resource.

Figure 3:
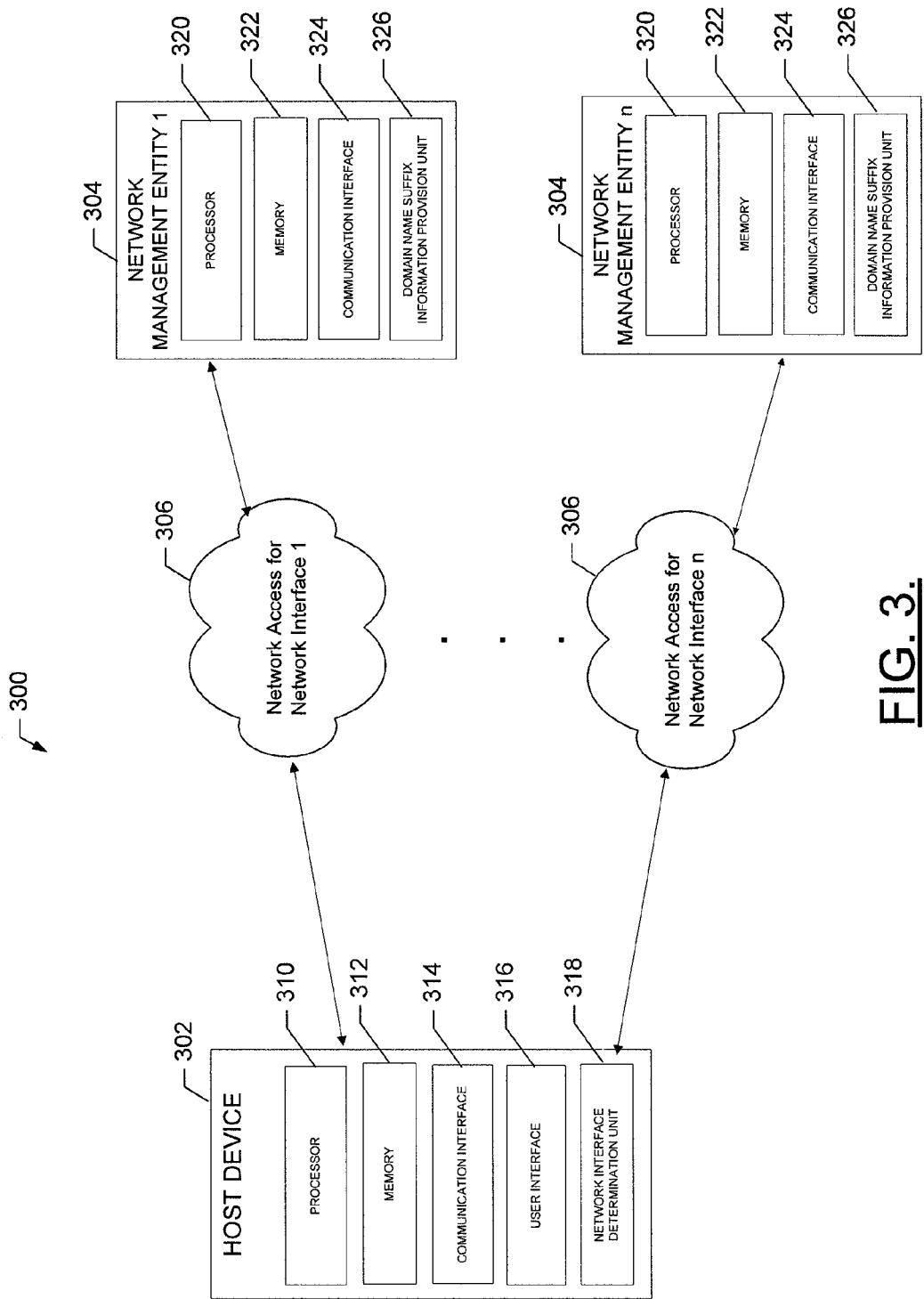
FIG. 3 illustrates a block diagram of a system for determining a network interface to access a network resource according to an exemplary embodiment of the present invention.

The problems illustrated in FIGS. 1 and 2 may be addressed by the system of FIG. 3, which illustrates a block diagram of a system 300 for determining a network interface to access a network resource according to an exemplary embodiment of the present invention. As used herein, "exemplary" merely means an example and as such represents one example embodiment for the invention and should not be construed to narrow the scope or spirit of the invention in any way. It will be appreciated that the scope of the invention encompasses many potential embodiments in addition to those illustrated and described herein. As such, while FIG. 3 illustrates one example of a configuration of a system for determining a network interface to access a network resource, numerous other configurations may also be used to implement embodiments of the present invention.

Referring now to FIG. 3, the system 300 may include a host device 302, such as the computing device 102 of FIGS. 1 and 2, comprising a plurality of network interfaces, numbered 1 through n, which may be used by the host device 302 to access network resources. Each network interface may provide access to various network resources (not illustrated for purposes of simplification of the system 300) as well as a network management entity 304 (e.g., network management entities 1 through n) through a network access 306 associated with the respective network interface (e.g., Network Access for Network Interface 1 through Network Access for Network Interface n). The network access 306 for each respective interface may comprise a wireline network, wireless network, or some combination thereof. In some embodiments, the network access 306 may comprise a virtual network interface, such as may facilitate a virtual private network tunnel. The host device 302 may be embodied as any computing device, mobile or fixed, and accordingly may be embodied as a server, desktop computer, laptop computer, mobile terminal, mobile computer, mobile phone, mobile communication device, game device, digital camera/camcorder, audio/video player, television device, radio receiver, digital video recorder, positioning device, any combination thereof, and/or the like. In an exemplary embodiment, the host device 302 may be embodied as a mobile terminal, such as that illustrated in FIG. 4

Figure 4:
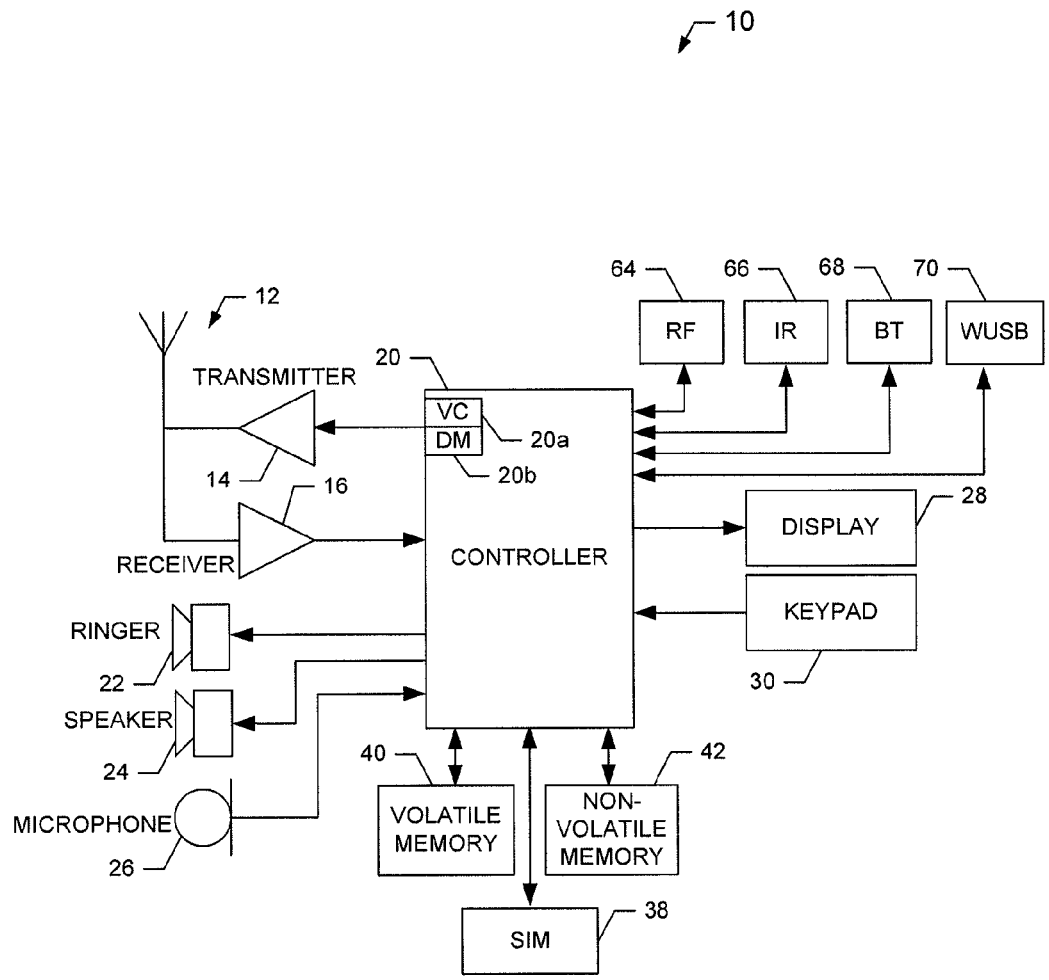
FIG. 4 is a schematic block diagram of a mobile terminal according to an exemplary embodiment of the present invention.

In this regard, FIG. 4 illustrates a block diagram of a mobile terminal 10 representative of one embodiment of a host device 302 in accordance with embodiments of the present invention. It should be understood, however, that the mobile terminal illustrated and hereinafter described is merely illustrative of one type of host device 302 that may benefit from embodiments of the present invention and, therefore, should not be taken to limit the scope of the present invention. While several embodiments of the electronic device are illustrated and will be hereinafter described for purposes of example, other types of electronic devices, such as mobile telephones, mobile computers, portable digital assistants (PDAs), pagers, laptop computers, desktop computers, gaming devices, televisions, and other types of electronic systems, may employ embodiments of the present invention.

As shown, the mobile terminal 10 may include an antenna 12 (or multiple antennas 12) in communication with a transmitter 14 and a receiver 16. The mobile terminal may also include a controller 20 or other processor(s) that provides signals to and receives signals from the transmitter and receiver, respectively. These signals may include signaling information in accordance with an air interface standard of an applicable cellular system, and/or any number of different wireless networking techniques, comprising but not limited to Wireless-Fidelity (Wi-Fi), wireless local access network (WLAN) techniques such as Institute of Electrical and Electronics Engineers (IEEE) 802.11, and/or the like. In addition, these signals may include speech data, user generated data, user requested data, and/or the like. In this regard, the mobile terminal may be capable of operating with one or more air interface standards, communication protocols, modulation types, access types, and/or the like. More particularly, the mobile terminal may be capable of operating in accordance with various first generation (1G), second generation (2G), 2.5G, third-generation (3G) communication protocols, fourth-generation (4G) communication protocols, and/or the like. For example, the mobile terminal may be capable of operating in accordance with 2G wireless communication protocols IS-136 (Time Division Multiple Access (TDMA)), Global System for Mobile communications (GSM), IS-95 (Code Division Multiple Access (CDMA)), and/or the like. Also, for example, the mobile terminal may be capable of operating in accordance with 2.5G wireless communication protocols General Packet Radio Service (GPRS), Enhanced Data GSM Environment (EDGE), and/or the like. Further, for example, the mobile terminal may be capable of operating in accordance with 3G wireless communication protocols such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The mobile terminal may be additionally capable of operating in accordance with 3.9G wireless communication protocols such as Long Term Evolution (LTE) or Evolved Universal Terrestrial Radio Access Network (E-UTRAN) and/or the like. Additionally, for example, the mobile terminal may be capable of operating in accordance with fourth-generation (4G) wireless communication protocols and/or the like as well as similar wireless communication protocols that may be developed in the future.

Some Narrow-band Advanced Mobile Phone System (NAMPS), as well as Total Access Communication System (TACS), mobile terminals may also benefit from embodiments of this invention, as should dual or higher mode phones (e.g., digital/analog or TDMA/CDMA/analog phones). Additionally, the mobile terminal 10 may be capable of operating according to Wireless Fidelity (Wi-Fi) protocols.

It is understood that the controller 20 may comprise circuitry for implementing audio/video and logic functions of the mobile terminal 10. For example, the controller 20 may comprise a digital signal processor device, a microprocessor device, an analog-to-digital converter, a digital-to-analog converter, and/or the like. Control and signal processing functions of the mobile terminal may be allocated between these devices according to their respective capabilities. The controller may additionally comprise an internal voice coder (VC) 20a, an internal data modem (DM) 20b, and/or the like. Further, the controller may comprise functionality to operate one or more software programs, which may be stored in memory. For example, the controller 20 may be capable of operating a connectivity program, such as a web browser. The connectivity program may allow the mobile terminal 10 to transmit and receive web content, such as location-based content, according to a protocol, such as Wireless Application Protocol (WAP), hypertext transfer protocol (HTTP), and/or the like. The mobile terminal 10 may be capable of using a Transmission Control Protocol/Internet Protocol (TCP/IP) to transmit and receive web content across the internet or other networks.

The mobile terminal 10 may also comprise a user interface including, for example, an earphone or speaker 24, a ringer 22, a microphone 26, a display 28, a user input interface, and/or the like, which may be operationally coupled to the controller 20. As used herein, "operationally coupled" may include any number or combination of intervening elements (including no intervening elements) such that operationally coupled connections may be direct or indirect and in some instances may merely encompass a functional relationship between components. Although not shown, the mobile terminal may comprise a battery for powering various circuits related to the mobile terminal, for example, a circuit to provide mechanical vibration as a detectable output. The user input interface may comprise devices allowing the mobile terminal to receive data, such as a keypad 30, a touch display (not shown), a joystick (not shown), and/or other input device. In embodiments including a keypad, the keypad may comprise numeric (0-9) and related keys (#, *), and/or other keys for operating the mobile terminal.

As shown in FIG. 4, the mobile terminal 10 may also include one or more means for sharing and/or obtaining data. For example, the mobile terminal may comprise a short-range radio frequency (RF) transceiver and/or interrogator 64 so data may be shared with and/or obtained from electronic devices in accordance with RF techniques. The mobile terminal may comprise other short-range transceivers, such as, for example, an infrared (IR) transceiver 66, a Bluetooth™ (BT) transceiver 68 operating using Bluetooth™ brand wireless technology developed by the Bluetooth™ Special Interest Group, a wireless universal serial bus (USB) transceiver 70 and/or the like. The Bluetooth transceiver 68 may be capable of operating according to ultra-low power Bluetooth technology (e.g., Wibree™) radio standards. In this regard, the mobile terminal 10 and, in particular, the short-range transceiver may be capable of transmitting data to and/or receiving data from electronic devices within a proximity of the mobile terminal, such as within 10 meters, for example. Although not shown, the mobile terminal may be capable of transmitting and/or receiving data from electronic devices according to various wireless networking techniques, including Wireless Fidelity (Wi-Fi), WLAN techniques such as IEEE 802.11 techniques, and/or the like.

The mobile terminal 10 may comprise memory, such as a subscriber identity module (SIM) 38, a removable user identity module (R-UIM), and/or the like, which may store information elements related to a mobile subscriber. In addition to the SIM, the mobile terminal may comprise other removable and/or fixed memory. The mobile terminal 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices (e.g., hard disks, floppy disk drives, magnetic tape, etc.), optical disc drives and/or media, non-volatile random access memory (NVRAM), and/or the like. Like volatile memory 40 non-volatile memory 42 may include a cache area for temporary storage of data. The memories may store one or more software programs, instructions, pieces of information, data, and/or the like which may be used by the mobile terminal for performing functions of the mobile terminal. For example, the memories may comprise an identifier, such as an international mobile equipment identification (IMEI) code, capable of uniquely identifying the mobile terminal 10.

Returning to FIG. 3, the host device is not limited to being embodied as a mobile terminal 10 and as previously described, may be embodied as any computing device, mobile or fixed. Each network management entity 304 may comprise a computing device configured as previously described. In an exemplary embodiment, each network management entity 304 may further be configured to store domain name suffix information indicating the accessibility of various network resources that may be accessed through the network on which the particular network management entity 304 resides and/or whether domain names corresponding to the stored domain name suffixes may be resolved by the particular network management entity 304. Each network management entity 304 may further be configured to provide the stored domain name suffix information to a host device 302. In some embodiments, each network management entity 304 may be configured to provide the stored domain name suffix information to the host device 302 in response to a request for domain name suffix information received from the host device 302. For example, network management entities 304 may be configured to provide the stored domain name suffix information in a DHCP option. In an exemplary embodiment, the DHCP option may be a newly defined option or may be an existing option that may be extended to provide the additional domain name suffix information. For example, option number 119, Domain Search Option, for DHCP/IP version 4, and/or option number 24, Domain Search List Option, for DHCP/IP version 6, may be extended for this purpose. Existing DHCP options, such as, for example, DHCP/IP version 4 option number 119 or DHCP/IP version 6 option number 24, may also be utilized without modification, although the existing options may not provide as much information as may be provided by new or extended options. Additionally or alternatively, a network management entity 304 may be configured to broadcast the stored domain name suffix information, such as periodically, to a host device 302.

Referring again to the host device 302, the host device 302 may include various means, such as a processor 310, memory 312, communication interface 314, user interface 316, and network interface determination (NID) unit 318 for performing the various functions herein described. These means of the host device 302 as described herein may be embodied as, for example, hardware elements (e.g., a suitably programmed processor, combinational logic circuit, and/or the like), computer code (e.g., software or firmware) embodied on a computer-readable medium (e.g. memory 312) that is executable by a suitably configured processing device (e.g., the processor 310), or some combination thereof. The processor 310 may, for example, be embodied as various means including a microprocessor, a coprocessor, a controller, or various other processing elements including integrated circuits such as, for example, an ASIC (application specific integrated circuit) or FPGA (field programmable gate array). In an exemplary embodiment, the processor 310 may be configured to execute instructions stored in the memory 312 or otherwise accessible to the processor 310. Although illustrated in FIG. 3 as a single processor, the processor 310 may comprise a plurality of processors.

The memory 312 may include, for example, volatile and/or non-volatile memory. The memory 312 may be configured to store information, data, applications, instructions, or the like for enabling the host device 302 to carry out various functions in accordance with exemplary embodiments of the present invention. For example, the memory 312 may be configured to buffer input data for processing by the processor 310. Additionally or alternatively, the memory 312 may be configured to store instructions for execution by the processor 310. The memory 312 may comprise one or more databases that store information in the form of static and/or dynamic information. In this regard, the memory 312 may store, for example, domain name suffix information, data about available network interfaces, priority levels associated with domain name suffix entries and/or with network interfaces, and/or the like. In an exemplary embodiment, the memory 312 may comprise a long-term memory and/or a short term cache. Data may be temporarily loaded into the short term cache for quick access when needed. This stored information may be stored and/or used by the NID unit 318 during the course of performing its functionalities.

The communication interface 314 may be embodied as any device or means embodied in hardware, software, firmware, or a combination thereof that is configured to receive and/or transmit data from/to a remote device, such as a network management entity 304 over a network. In this regard, the communication interface 314 may comprise one or more network interfaces. In one embodiment, the communication interface 314 may be at least partially embodied as or otherwise controlled by the processor 310. The communication interface 314 may include, for example, an antenna, a transmitter, a receiver, a transceiver and/or supporting hardware or software for enabling communications with other entities of the system 300. The communication interface 314 may be configured to receive and/or transmit data using any protocol that may be used for communications between computing devices of the system 300. The communication interface 314 may additionally be in communication with the memory 312, user interface 316, and/or NID unit 318, such as via a bus.

The user interface 316 may be in communication with the processor 310 to receive an indication of a user input and/or to provide an audible, visual, mechanical, or other output to the user. As such, the user interface 316 may include, for example, a keyboard, a mouse, a joystick, a display, a touch screen display, a microphone, a speaker, and/or other input/output mechanisms. However, in an embodiment wherein the host device 302 is embodied as a server, elements of the user interface may be reduced or even eliminated. The user interface 316 may further be in communication with the memory 312, communication interface 316, and/or NID unit 318, such as via a bus.

The NID unit 318 may be embodied as various means, such as hardware, software, firmware, or some combination thereof and, in one embodiment, may be embodied as or otherwise controlled by the processor 310. In embodiments where the NID unit 318 is embodied separately from the processor 310, the NID unit 318 may be in communication with the processor 310. The NID unit 318 may be configured to maintain domain name suffix information, such as may be stored in the memory 312. The maintained domain name suffix information may be also be stored remotely from the host device 302, such as in memory of a remote network device. The maintained domain name suffix information may comprise a plurality of domain name suffix entries. Each domain name suffix entry may comprise a domain name suffix and may indicate accessibility of a domain name corresponding to the domain name suffix over a network interface. In this regard, each domain name suffix entry may be associated with a particular network interface and may indicate whether a network management entity 304 accessible over the network interface may resolve a domain name corresponding to the domain name suffix of the domain name suffix entry and/or accessibility of a domain name corresponding to the domain name suffix over the network interface. The domain name suffix in a domain name suffix entry may implicitly indicate accessibility of a domain name corresponding to the domain name suffix in that the presence of the entry indicates a network interface through which the domain name suffix is accessible. For example, the domain name suffix entry comprising the domain name suffix "*.*" in association with a network interface may indicate that all domain names that the network management entity 304 is aware of may be resolved and/or accessed via the network interface. In another example, the domain name suffix entry comprising the domain name suffix "*.corporation.com" in association with a network interface may indicate that all domain names that the network management entity 304 is aware of ending in ".corporation.com" may be resolved and/or accessed via the network interface. Additionally or alternatively, a domain name suffix entry may explicitly indicate accessibility of a domain name corresponding to the domain name suffix. In this regard, each domain name suffix entry may comprise associated accessibility information. For example, the accessibility information may indicate that a domain name corresponding to the associated domain name suffix is accessible over the network interface, is not accessible over the network interface, a preference level (e.g., a priority level) to which the network interface is preferred for accessing a domain name corresponding to the domain name suffix, and/or the like. The maintained domain name suffix information may be stored, for example, in a database. However, it will be appreciated that other storage structures are possible, and thus where "domain name suffix database" is used herein, it is merely for purposes of example of one storage and organization methodology for maintaining domain name suffix information.

The NID unit 318 may be configured to receive domain name suffix information associated with a network interface, which may comprise one or more domain name suffixes. The received domain name suffix information may further comprise accessibility information associated with each domain name suffix. This domain name suffix information may be received from a variety of sources, including, for example, from a network management entity 304, through static entry by a user of the host device 302, through network access specific means (e.g., Third Generation Partnership Project bearer activation signaling standards for a cellular network interface), through peer-to-peer communications with other computing devices, through operator provisioning, from a uniform integrated circuit card, in an e-mail, in a short message service message, and/or the like. The NID unit 318 may receive domain name suffix information from a network management entity 304 in response to a request sent to the network management entity 304 by the NID unit 318. The request may comprise, for example, a request for a DHCP option. The received domain name suffix information may be included in a DHCP option, such as, for example, a domain search option or domain search list option. The NID unit 318 may be configured to request domain name suffix information from a network management entity 304 periodically. In some embodiments, the NID unit 318 may be configured to request domain name suffix information from a network management entity 304 associated with a particular network interface when the network interface is added to and/or activated on the host device 302. The NID unit 318 may additionally or alternatively be configured to receive domain name suffix information from a network management entity 304 when it is broadcast or otherwise advertised by the network management entity 304.

The NID unit 318 may be configured to update the domain name suffix database with the received domain name suffix information. In this regard, for each domain name suffix and associated accessibility information received from a network management entity 304, the NID unit 318 may be configured to determine whether there is an existing entry for the received domain name suffix. If there is no existing entry for the received domain name suffix, then the NID unit 318 may be configured to add a new entry comprising the received domain name suffix and any associated accessibility information. If, however, there are one or more existing entries for the received domain name suffix, the NID unit 318 may further determine whether there is an existing entry for the received domain name suffix corresponding to the network interface through which the received domain name suffix was received. If there is such an existing entry, then the NID unit 318 may update the existing entry. If, however, there is no such existing entry and thus all existing entries for the received domain name suffix correspond to other network interfaces, the NID unit 318 may add a new entry to the domain name suffix database comprising the received domain name suffix and any associated accessibility information. The NID unit 318 may further be configured to prioritize all entries for the received domain name suffix by associating a priority level with each entry. The priority level may indicate a degree to which the particular network interface is preferred for use to access a domain name corresponding to the domain name suffix.

In an exemplary embodiment, the NID unit 318 may be configured to receive a request for resolution of a domain name. This request may be received from an application embodied on the host device 302 that may be executed by the processor 310. For example, a request may be generated by a web browser application when a user enters a domain name into the navigation bar of the web browser. The NID unit 318 may be configured to search the domain name suffix database for one or more domain name suffix entries corresponding to the domain name. The NID unit 318 may further be configured to determine one or more network interfaces through which the domain name is accessible and/or a network interface through which a network management entity 304 capable of resolving the domain name may be accessed based at least in part upon the accessibility information associated with each determined domain name suffix entry.

The NID unit 318 may be configured to select a network interface for resolving the domain name into a network address from the one or more determined network interfaces. If there is only one determined network interface (e.g., only one domain name suffix entry with associated accessibility information indicating that the domain name is accessible), then the NID unit 318 may accordingly select that network interface. If, however, there are multiple determined network interfaces, the NID unit 318 may be configured to select among them. One criteria that may be used to filter the determined network interfaces is to determine which of the determined network interfaces are available. In this regard, an available network interface need not be currently open or otherwise active, but a network access corresponding to the network interface must be currently accessible such that the network interface may be opened and used. Accordingly, a network interface corresponding to an out of range network access point may not be an available network interface. The NID unit 318 may further be configured to filter the determined network interfaces to select a network interface through a variety of policies, such as most recently used network interface, a default network interface, preference for a currently open network interface, a predefined network interface preference or priority hierarchy, and/or the like.

In an exemplary embodiment, the NID unit 318 may be configured to select a network interface from the one or more determined network interfaces based at least in part upon a preference level or priority level associated with the respective domain name suffix entries and/or with the respective network interfaces. The priority level may comprise an indication a trust level associated with a network interface, speed of a network interface, cost of using a network interface, an accessibility level indicated in a domain name suffix entry, and/or the like. For example, the accessibility information associated with a domain name suffix may indicate that a certain network interface is particularly good for accessing domain names corresponding to a certain suffix. Accordingly, the NID unit 318 may be configured to prioritize that network interface for corresponding domain names. Trust level may be a factor in prioritization based upon the security level of a network interface. For example, a VPN network interface may be more trusted than an unknown WLAN network interface and thus may have a higher associated priority level based upon trust. However, certain WLANs (e.g., password secured WLANs, employer controlled WLANs, etc) may be known and designated as trusted network interfaces. Speed and cost may also be factors in the priority level. For example, a WLAN network interface may have a faster data transfer rate and provide a lower cost per unit of access time and/or unit of data transferred than a cellular network interface and thus may have a higher associated priority level based upon speed and cost.

In some embodiments, the NID unit 318 may be configured to select a network interface as described above only if resolution of the domain name fails on a default or otherwise preferred network interface. Further, in another scenario, if the NID unit 318 does not determine any domain name suffix entries in the domain name suffix database corresponding to the domain name for which a resolution request was received, then the NID unit 318 may be configured to select a default network interface or to select a network interface through internal default prioritization hierarchy, which may be defined through any of the priority level preferences described above (e.g., trust, speed, cost, and/or the like).

The NID unit 318 may be configured to perform a reverse domain name lookup, such as, for example, when a request for a connection to a network address is received. The NID unit 318 may be configured to search for the network address in a DNS cache, such as may be stored in the memory 312, for the host device 302. If the NID unit 318 finds the network address in the DNS cache, the NID unit 318 may determine the corresponding domain name and may then search the domain name suffix database for a corresponding domain name suffix and select an appropriate network interface according to any of the methods discussed above.

In an exemplary embodiment, the NID unit 318 may be configured to update the domain name suffix database by removing stale domain name suffix entries. For example, the entries may be cleared according to various criteria that may reflect or otherwise approximate the validity or trustworthiness of database entries. For example, domain name suffix entries may be cleared upon reboot of the host device 302. Domain name suffix entries may be deleted after a predefined time period. The NID unit 318 may be configured to delete domain name suffix entries for network interfaces for which resolution of a corresponding domain name and/or access to a network resource addressed by a corresponding domain name failed. In still another example, the NID unit 318 may be configured to remove a domain name suffix entry previously received from a network management entity 304 if the same network management entity 304 does not advertise that particular domain name suffix. In this regard, the NID unit 318 may assume, for example, that the network management entity 304 no longer provides access to or ability to resolve domain names corresponding to that domain name suffix.

Each network management entity 304 may include various means, such as a processor 320, memory 322, communication interface 324, and domain name suffix information provision (DNSIP) unit 318 for performing the various functions herein described. These means of the network management entity 304 as described herein may be embodied as, for example, hardware elements (e.g., a suitably programmed processor, combinational logic circuit, and/or the like), computer code (e.g., software or firmware) embodied on a computer-readable medium (e.g. memory 322) that is executable by a suitably configured processing device (e.g., the processor 320), or some combination thereof. The processor 320 may, for example, be embodied as various means including a microprocessor, a coprocessor, a controller, or various other processing elements including integrated circuits such as, for example, an ASIC (application specific integrated circuit) or FPGA (field programmable gate array). In an exemplary embodiment, the processor 320 may be configured to execute instructions stored in the memory 322 or otherwise accessible to the processor 320. Although illustrated in FIG. 3 as a single processor, the processor 320 may comprise a plurality of processors, such as a multiprocessor system. The multiple processors may be embodied in a single computing device or may be distributed across a plurality of computing devices, such as, for example, a server cluster or rack of blade servers.

The memory 322 may include, for example, volatile and/or non-volatile memory. The memory 322 may be configured to store information, data, applications, instructions, or the like for enabling the network management entity 304 to carry out various functions in accordance with exemplary embodiments of the present invention. For example, the memory 322 may be configured to buffer input data for processing by the processor 320. Additionally or alternatively, the memory 322 may be configured to store instructions for execution by the processor 320. The memory 322 may comprise one or more databases that store information in the form of static and/or dynamic information. In this regard, the memory 322 may store, for example, domain name suffix information. This stored information may be stored and/or used by the DNSIP unit 326 during the course of performing its functionalities.

The communication interface 324 may be embodied as any device or means embodied in hardware, software, firmware, or a combination thereof that is configured to receive and/or transmit data from/to a remote device, such as a host device 302 over a network. In one embodiment, the communication interface 324 may be at least partially embodied as or otherwise controlled by the processor 320. The communication interface 324 may include, for example, an antenna, a transmitter, a receiver, a transceiver and/or supporting hardware or software for enabling communications with other entities of the system 300. The communication interface 324 may be configured to receive and/or transmit data using any protocol that may be used for communications between computing devices of the system 300. The communication interface 324 may additionally be in communication with the memory 322 and/or DNSIP unit 326, such as via a bus.

The DNSIP unit 326 may be embodied as various means, such as hardware, software, firmware, or some combination thereof and, in one embodiment, may be embodied as or otherwise controlled by the processor 320. In embodiments where the DNSIP unit 326 is embodied separately from the processor 320, the DNSIP unit 326 may be in communication with the processor 320. The DNSIP unit 326 may be configured to determine, receive, and/or store domain name suffix information indicating domain names that may be resolved by the network management entity 304 and/or may be accessed through a network interface on which the network management entity 304 resides. In this regard, the DNSIP unit 326 may be configured to implement any of the functionality attributed to the network management entity 304. Accordingly, the DNSIP unit 326 may be configured to receive a request for domain name suffix information from a computing device of the system 300, such as, a host device 302, access domain name suffix information stored in the memory 322, and may provide domain name suffix information to the requesting device in response to receipt of the request. For example, the DNSIP unit 326 may be configured to receive a DHCP option request and may provide domain name suffix information to the requesting device in a DHCP option response, such as, for example, a domain search option or domain search list option. Additionally or alternatively, the DNSIP unit 326 may be configured to broadcast the stored domain name suffix information, such as periodically, to a host device 302.

FIGS. 5-11 are flowcharts of systems, methods, and computer program products according to exemplary embodiments of the invention. It will be understood that each block or step of the flowcharts, and combinations of blocks in the flowcharts, may be implemented by various means, such as hardware, firmware, and/or software including one or more computer program instructions. For example, one or more of the procedures described above may be embodied by computer program instructions. In this regard, the computer program instructions which embody the procedures described above may be stored by a memory device of a mobile terminal, server, or other computing device and executed by a processor in the computing device. In some embodiments, the computer program instructions which embody the procedures described above may be stored by memory devices of a plurality of computing devices. As will be appreciated, any such computer program instructions may be loaded onto a computer or other programmable apparatus to produce a machine, such that the instructions which execute on the computer or other programmable apparatus create means for implementing the functions specified in the flowchart block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowchart block(s) or step(s).

Accordingly, blocks or steps of the flowcharts support combinations of means for performing the specified functions, combinations of steps for performing the specified functions and program instruction means for performing the specified functions. It will also be understood that one or more blocks or steps of the flowcharts, and combinations of blocks or steps in the flowcharts, may be implemented by special purpose hardware-based computer systems which perform the specified functions or steps, or combinations of special purpose hardware and computer instructions.

Figure 5:
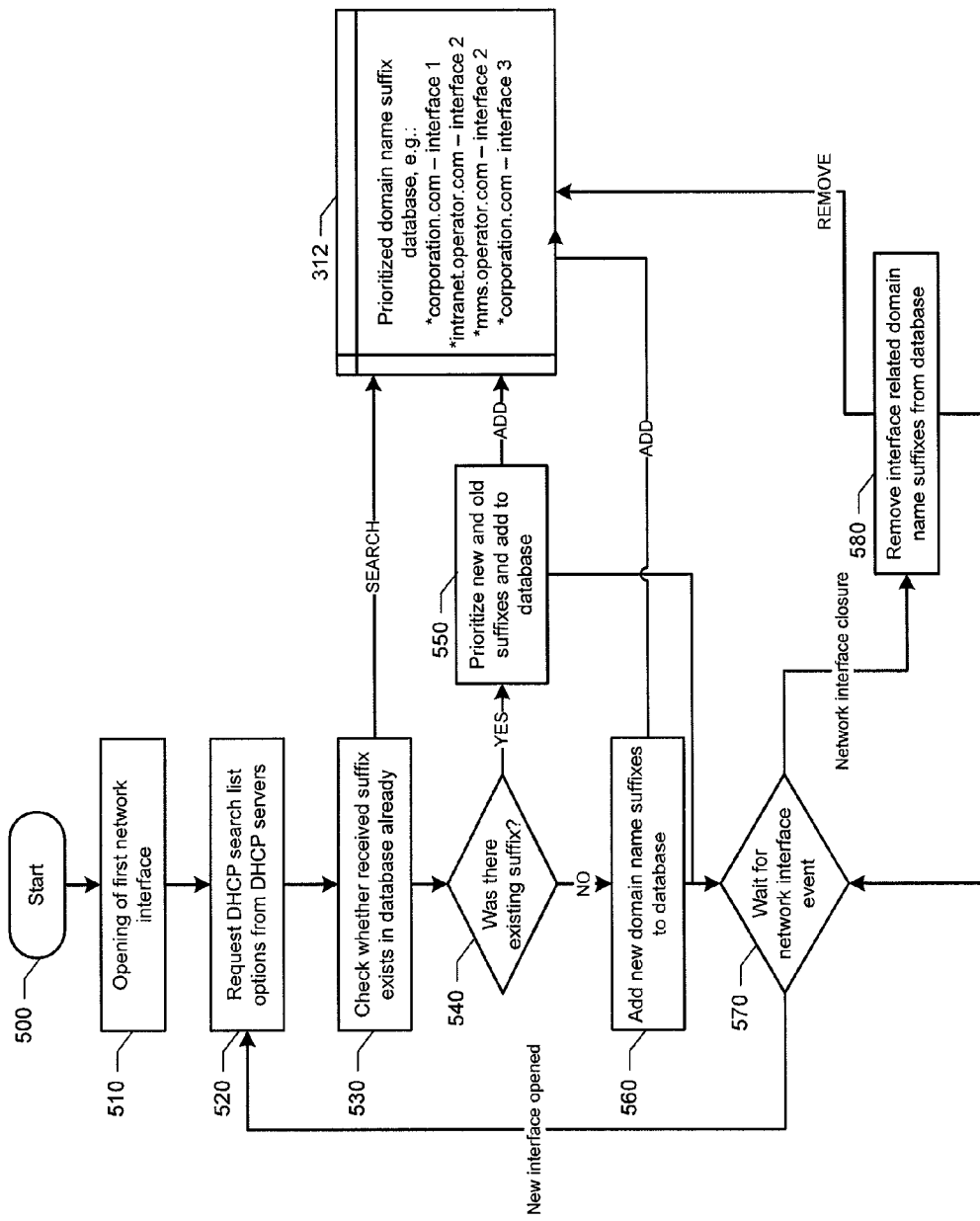
FIG. 5 is a flowchart according to an exemplary method for updating stored domain name suffix information, such as may be stored in a short-term memory, according to an exemplary embodiment of the present invention.

In this regard, one exemplary method for updating stored domain name suffix information, such as may be stored in a short term memory (e.g., a short-term cache), according to an exemplary embodiment of the present invention is illustrated in FIG. 5. The method may include the NID unit 318 opening a first network interface, at operation 510. Operation 520 may comprise the NID unit 318 requesting DHCP search list options from one or more DHCP servers, e.g., network management entities 304, accessible over the network interface. Operation 530 may comprise the NID unit 318 checking whether received domain name suffix exists in the domain name suffix database by searching the domain name suffix database, which may be stored in memory 312. Based upon the search, the NID unit 318 may determine whether there was an existing suffix corresponding to the received suffix, at operation 540. If there was, then the NID unit 318 may prioritize the new and old suffixes and add a new domain name suffix entry to the domain name suffix database, at operation 550. If not, the NID unit 318 may add the new domain name suffix to the domain name suffix database, at operation 560. Operation 570 may comprise the NID unit 318 waiting for a network interface event (e.g., opening a network interface, closing a network interface, and/or the like). If a network interface is opened, the method may return to operation 520. If, however, an open network interface is closed, the method may, in some embodiments, include the NID unit 318 optionally removing domain name suffixes form the database that are related to the closed interface, at operation 580. In such embodiments, operation 580 may provide for ensuring that the domain name suffix database includes fresh, valid entries for each network interface. In still other embodiments, however, operation 580 may comprise the NID unit 318 only removing the network interface related domain name suffix entries from a short term cache comprising a subset of entries of the domain name suffix database. This cache may only include entries for currently open network interfaces and thus may reduce memory usage and search time when looking up a domain name in the domain name suffix database to determine a corresponding domain name suffix.

Figure 6:
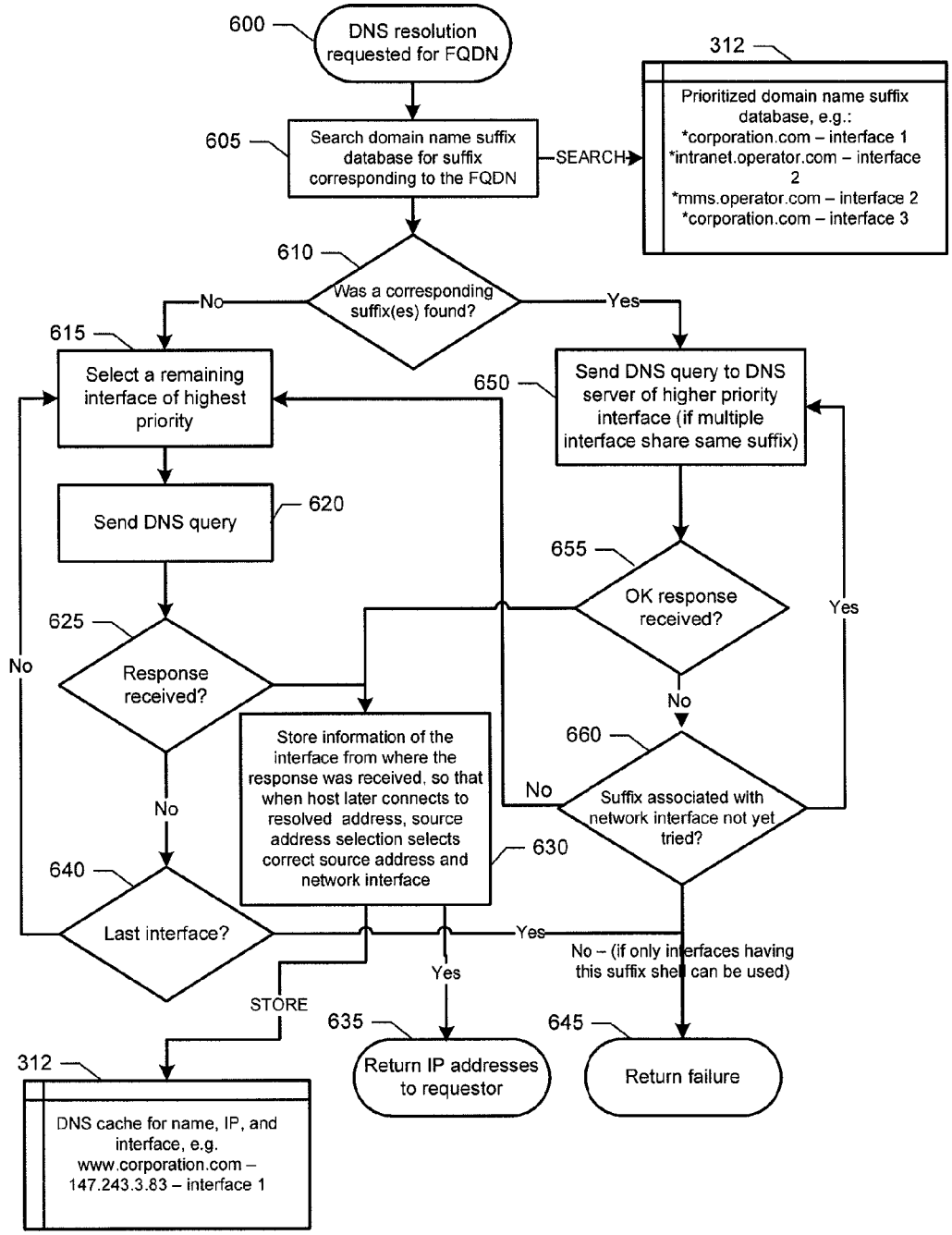
FIG. 6 is a flowchart according to an exemplary method for determining a network interface to access a network resource according to an exemplary embodiment of the present invention.

FIG. 6 illustrates a flowchart according to an exemplary method for determining a network interface to access a network resource according to an exemplary embodiment of the present invention. The method may include the NID unit 318 receiving a DNS resolution request for a fully qualified domain name (FQDN), at operation 600. Operation 605 may comprise the NID unit 318 searching the domain name suffix database for a domain name suffix entry corresponding to the FQDN. The NID unit 318 may determine whether a corresponding suffix(es) was found, at operation 610, and if so, may determine one or more network interfaces through which the domain name is accessible.

If a corresponding domain name suffix entry was not found, the NID unit may select a remaining available network interface having highest default priority order, at operation 615. Operation 620 may comprise the NID unit 318 sending a DNS query to a network management entity 304 over the selected network interface. Operation 625 may comprise the NID unit 318 determining whether a successful (e.g., non-error) response was received. If so, the NID unit 318 may store (e.g., in a DNS cache stored in memory 312) information regarding the network interface from which the response was received, so that when the host device 302 later connects to the resolved address, the NID unit 318 may select the correct source address and network interface, at operation 630. Operation 635 may comprise the NID unit 318 returning resolved IP address(es) to the requestor. If, a successful response was not received at operation 625, Operation 640 may comprise the NID unit 318 determining whether there is a remaining interface over which a DNS query has not been send and, if so, returning to operation 615. If all available network interfaces have been exhausted without receiving a successful response, the NID unit 318 may return a failure message to the requestor, at operation 645.

If, on the other hand, a corresponding domain name suffix entry was found at operation 610, operation 650 may comprise the NID unit 318 sending a query to a DNS server of highest priority network interface over which the domain name is accessible. Operation 655 may comprise the NID unit determining whether a successful response was received. If so, then the NID unit may execute operations 630 and 635 as described above. If not, the NID unit may determine whether there are domain name suffix entries corresponding to the FQDN having associated network interfaces not yet tried, at operation 660. If so, the method may return to operation 650 where a query may be sent over the next highest priority interface. If not, the method may proceed to Operation 615 and proceed as described above to select a remaining network interface having highest default priority. If all available network interfaces have been exhausted without receiving a successful response, the NID unit 318 may return a failure message to the requestor, at operation 645.

Figure 7:
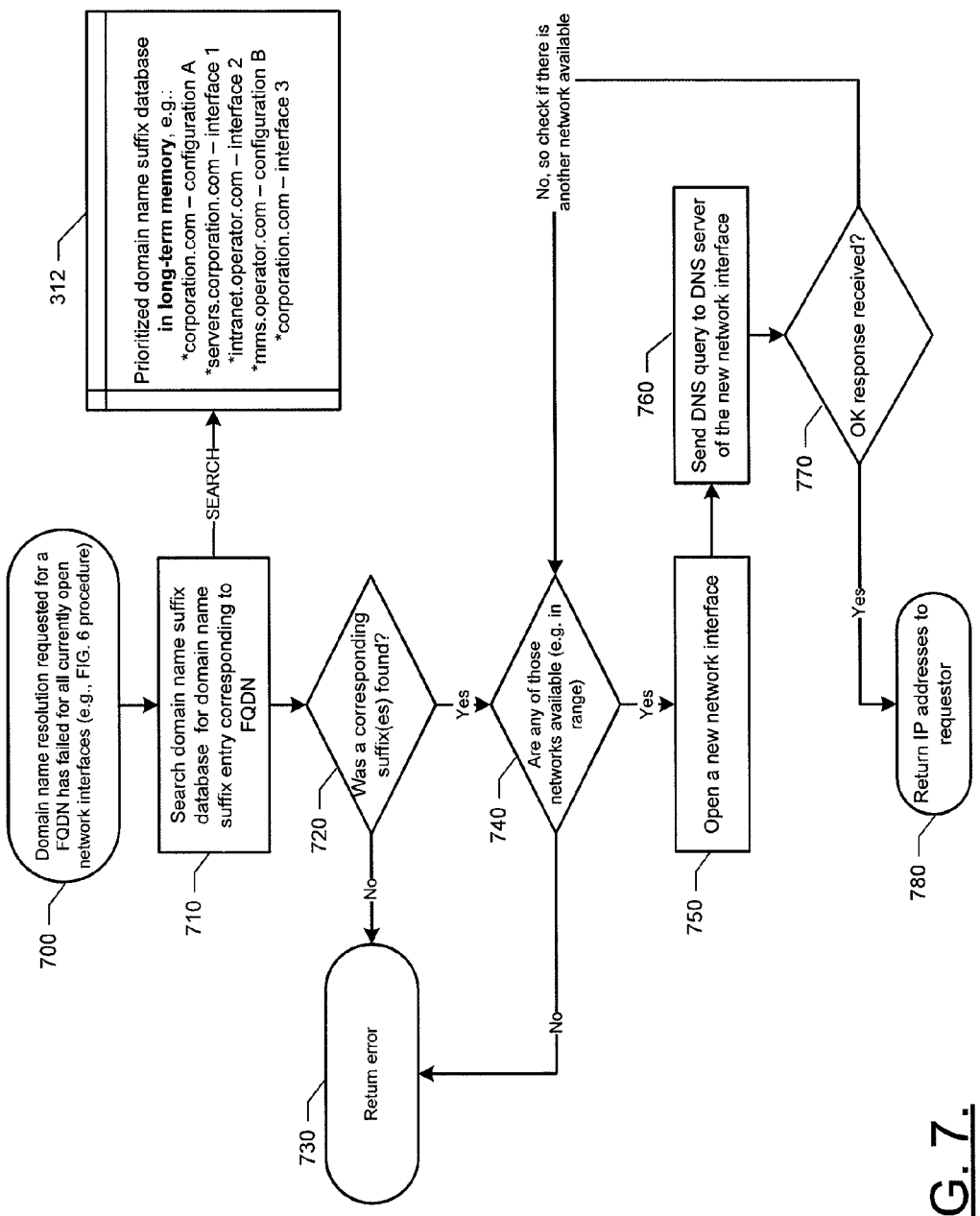
FIG. 7 is a flowchart according to an exemplary method for determining a network interface to access a network resource after open network interfaces have failed according to an exemplary embodiment of the present invention.

FIG. 7 illustrates a flowchart according to an exemplary method for determining a network interface to access a network resource after open network interfaces, such as may have been tried in the method of FIG. 6, have failed according to an exemplary embodiment of the present invention. In such an embodiment, the domain name suffix database searched in the method of FIG. 6 may comprise a short term cache including only domain name suffix entries for currently open interfaces. Accordingly, operation 710 may comprise the NID unit 318 searching a domain name suffix database stored in a long-term memory, such as in memory 312, which may include domain name suffix entries associated with network interfaces not currently opened. Operation 720 may include the NID unit 318 determining whether a corresponding domain name suffix entry was found, and if so, determining one or more network interfaces through which the domain name is accessible. If a corresponding domain name suffix entry was not found, the NID unit 318 may return an error, at operation 730. If a corresponding entry was found, then Operation 740 may comprise the NID unit 318 determining whether any of the network(s) corresponding to the network interface(s) associated with the found domain name suffix(es) is available. If so, then the NID unit 318 may open a new network interface corresponding to an available network, at operation 750. Operation 760 may comprise the NID unit 318 sending a DNS query for resolution of the FQDN to a DNS server of the newly opened network interface. Operation 770 may comprise the NID unit 318 determining whether a successful response was received. If so, the NID unit 318 may return the received IP address to the requestor, at operation

780. If a successful response was not received, the method may return to operation 740 where the NID unit 318 may determine whether there is a remaining network interface available.

Figure 8:
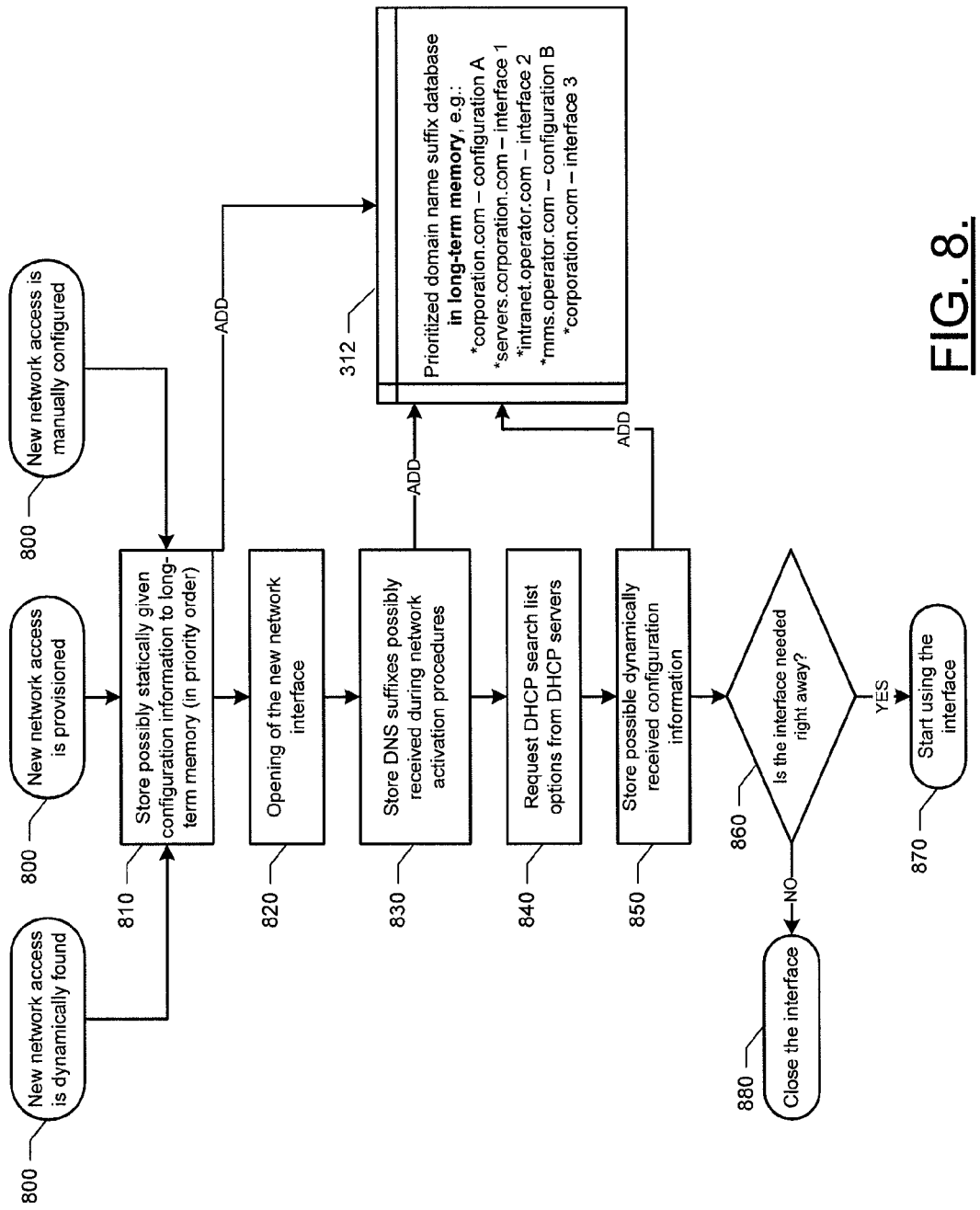
FIG. 8 is a flowchart according to an exemplary method for updating stored domain name suffix information, such as may be stored in a long term memory, according to an exemplary embodiment of the present invention.

FIG. 8 illustrates a flowchart according to an exemplary method for updating stored domain name suffix information, such as may be stored in a long term memory, according to an exemplary embodiment of the present invention. The method may include identifying a new network interface, at Operation 800. In this regard, the new network interface may be identified, for example, by dynamically finding a new network access, provision of a new network access (e.g., by a network operator), or through manual configuration by a user of the host device 302. Operation 810 may comprise the NID unit 318 storing any static configuration information for using the network interface in long-term memory, such as in memory 312. The configuration information may be stored in priority order. Operation 820 may comprise the NID unit 318 opening the new network interface. The NID unit 318 may receive domain name suffix information during activation of the network interface and may accordingly store that received information in the domain name suffix database, at operation 830. Operation 840 may comprise the NID unit 318 sending a DHCP search list option request to a network management entity 304, such as a DHCP server, over the network interface so as to request domain name suffix information for the network interface. Operation 850 may comprise the NID unit 318 receiving domain name suffix information and storing the received information in the domain name suffix database. The NID unit 318 may then optionally determine whether the network interface is currently needed, at operation 860. If the network interface is currently needed, then the network interface may be used, at operation 870, but if the network interface is not currently needed, the NID unit 318 may close the network interface, at operation 880.

Figure 9:
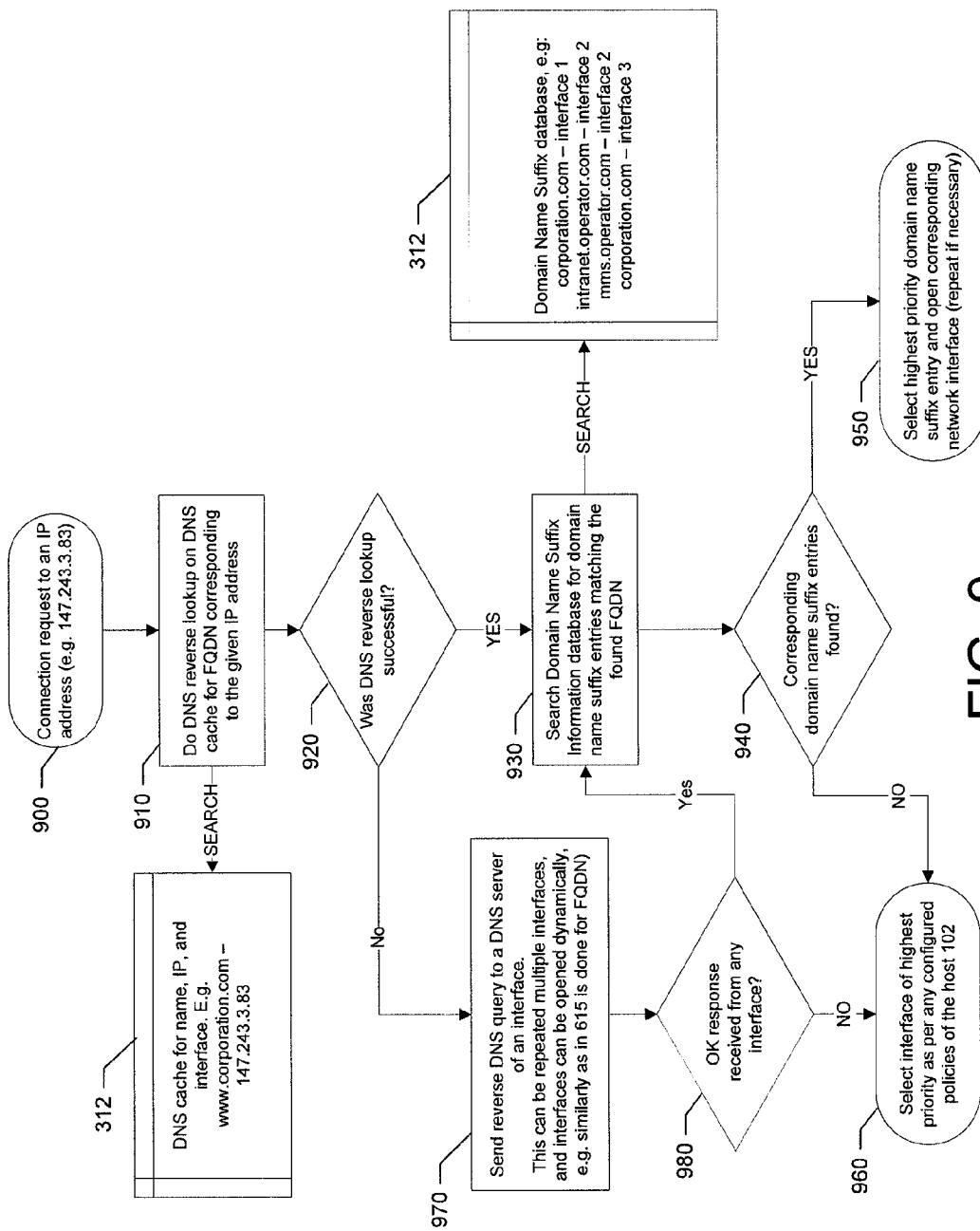
FIG. 9 is a flowchart according to an exemplary method for determining a network interface to access a network resource using reverse domain name lookup according to an exemplary embodiment of the present invention.

FIG. 9 illustrates a flowchart according to an exemplary method for determining a network interface to access a network resource using reverse domain name lookup according to an exemplary embodiment of the present invention. The method may include receiving a connection request for a network address, such as an IP address, at operation 900. Operation 910 may comprise the NID unit 318 performing a reverse lookup for the IP address in the host device's DNS cache, which may be stored in memory 312, to determine a FQDN corresponding to the IP address. Operation 920 may comprise the NID unit 318 determining whether the reverse lookup was successful in determining the FQDN corresponding to the IP address. If the reverse lookup was successful, the NID unit 318 may search the domain name suffix database for a domain name suffix entry corresponding to the FQDN and determine a network interface over which the requested IP address is accessible, at operation 930. Operation 940 may comprise the NID unit 318 determining whether any corresponding domain name suffix entries were found. If corresponding domain name suffix entries were found, the NID unit 318 may select the highest priority domain name suffix entry and open the corresponding network interface, at operation 950. Operation 950 may be repeated in priority order for each domain name suffix entry until a successful connection is achieved. If, corresponding domain name entries were not found, the NID unit may select the network interface of highest priority according to any configured or default priority policies of the host 102, at operation 920.

If, on the other hand, at operation 920, the NID unit determines that the DNS reverse lookup was not successful, the NID unit 318 may select a network interface, such as according to default priority policies of the host 102, and send a reverse DNS query to a DNS server of the selected network interface, at operation 970. Operation 970 may be repeated until a successful response to the reverse DNS query is received (or until all available network interfaces have been exhausted). Operation 980 may comprise the NID unit 318 determining whether a successful response was received from any network interface. If a successful response was received, the method may proceed to operation 930. If a successful response was not received, the method may proceed to operation 960 where a connection to the IP address may be attempted over a network interface selected according to any configured or default priority policies of the host 102.

Figure 10:
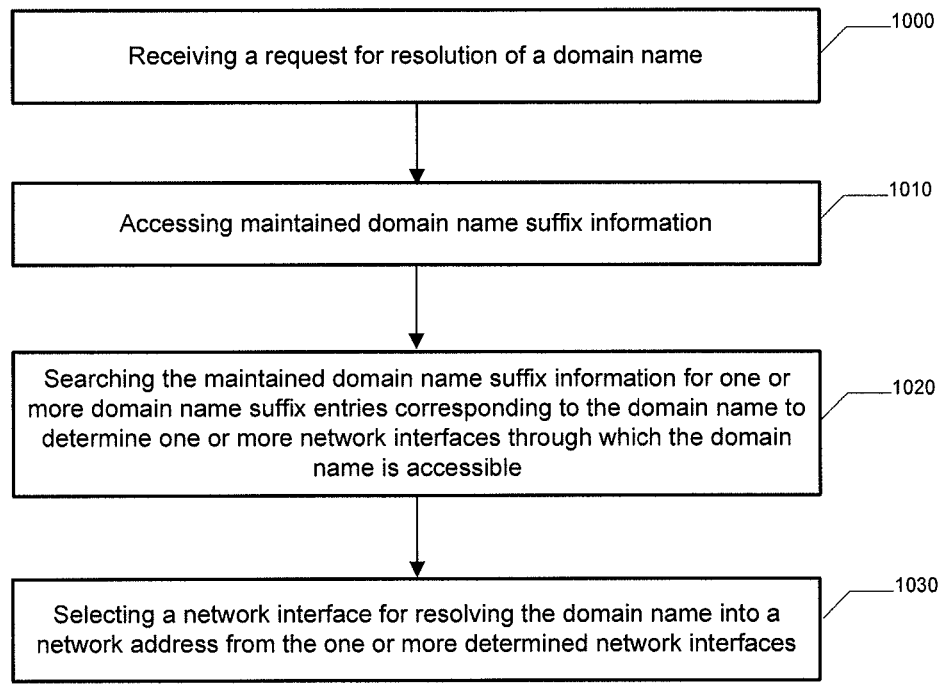
FIG. 10 is a flowchart according to an exemplary method for determining a network interface to access a network resource according to an exemplary embodiment of the present invention.

FIG. 10 illustrates a flowchart according to an exemplary method for determining a network interface to access a network resource according to an exemplary embodiment of the present invention. The method may include the NID unit 318 receiving a request for resolution of a domain name at operation 1000. Operation 1010 may comprise the NID unit 318 maintaining domain name suffix information. The maintained domain name suffix information may comprise a domain name suffix database and may comprise a plurality of domain name suffix entries. Each domain name suffix entry may comprise a domain name suffix and may indicate accessibility of a domain name corresponding to the domain name suffix over a network interface. The maintained domain name suffix information may be stored locally to the host device 302, such as in memory 312, or may be stored in memory of a remote device. The NID unit 318 may then search the maintained domain name suffix information for one or more domain name suffix entries corresponding to the domain name to determine one or more network interfaces through which the domain name is accessible, at operation 1020. Operation 1030 may comprise the NID unit 318 selecting a network interface for resolving the domain name into a network address from the one or more determined network interfaces.

Figure 11:
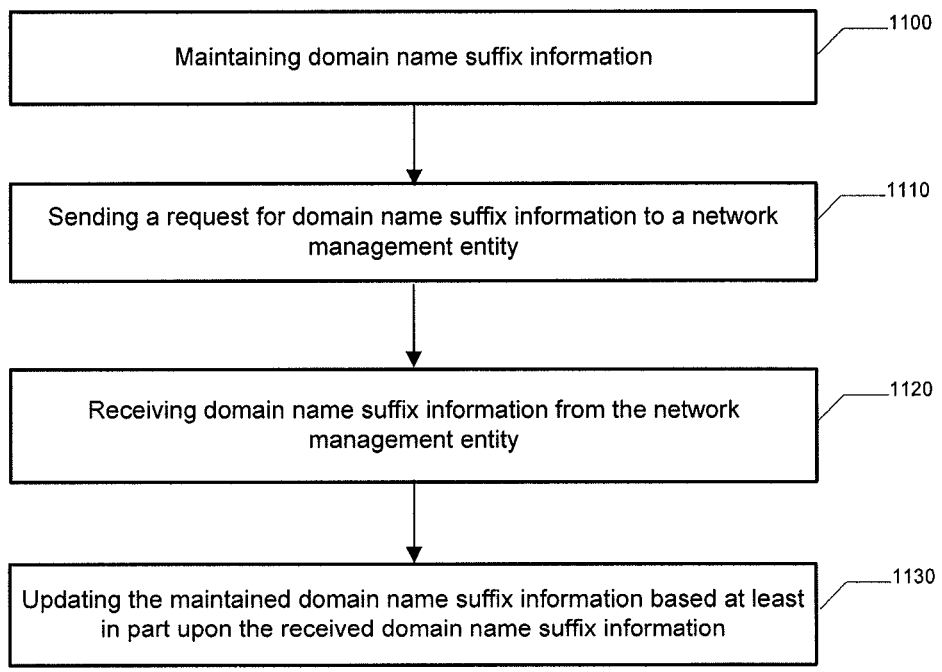
FIG. 11 is a flowchart according to an exemplary method for obtaining and updating stored domain name suffix information according to an exemplary embodiment of the present invention.

FIG. 11 illustrates a flowchart according to an exemplary method for obtaining and updating stored domain name suffix information according to an exemplary embodiment of the present invention. The method may include the NID unit 318 maintaining domain name suffix information, at operation 1100. The maintained domain name suffix information may comprise a plurality of domain name suffix entries and each domain name suffix entry may comprise a domain name suffix and indicate accessibility of a domain name corresponding to the domain name suffix over a network interface. Operation 1110 may comprise the NID unit 318 sending a request for domain name suffix information to a network management entity 304. The NID unit 318 may then receive domain name suffix information from the network management entity 304, at operation 1120. Operation 1130 may comprise the NID unit 318 updating the maintained domain name suffix information based at least in part upon the received domain name suffix information.

The above described functions may be carried out in many ways. For example, any suitable means for carrying out each of the functions described above may be employed to carry out embodiments of the invention. In one embodiment, a suitably configured processor may provide all or a portion of the elements of the invention. In another embodiment, all or a portion of the elements of the invention may be configured by and operate under control of a computer program product. The computer program product for performing the methods of embodiments of the invention includes a computer-readable storage medium, such as the non-volatile storage medium, and computer-readable program code portions, such as a series of computer instructions, embodied in the computer-readable storage medium.

As such, then, some embodiments of the invention may provide several advantages to a user of a computing device, such as a mobile terminal 10. Embodiments of the invention may provide for maintaining domain name suffix information, which may indicate what domain names may be accessed and/or resolved over a network interface, which cannot be resolved over a network interface, and/or a preference level to which the network interface is preferred for accessing and/or resolving a domain name. Accordingly, an appropriate network interface may be selected for resolving a domain name and connecting to the associated network address. Selection of an appropriate network address may result in fewer errors that would otherwise result from attempting to resolve a domain name over a network interface through which the domain name cannot be resolved. Accordingly, users of host devices, such as a user of a web browser, may benefit from experiencing fewer connectivity errors from failed attempts to resolve domain names. Further, in some embodiments, a network interface may be selected according to defined priority levels, which may take into account trust level, speed, and/or cost of available network interfaces when selecting a network interface. Accordingly, end users may benefit from embodiments that select a secure and/or efficient network interface.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
  receiving a request for resolution of a fully qualified domain name;
  accessing maintained domain information, wherein the maintained domain information comprises a plurality of domain entries, each domain entry comprising a domain and indicating accessibility of the fully qualified domain name corresponding to the domain over a network interface;
  searching the maintained domain information for one or more domain entries corresponding to the fully qualified domain name to determine one or more network interfaces through which the fully qualified domain name is accessible;
  selecting a domain name server associated with the one or more network interfaces; and
  updating the maintained domain information,
  wherein the updating the maintained domain information comprises:
    receiving a first domain,
    adding a new entry to the maintained domain information comprising the received first domain,
    determining whether there is an existing entry for the received first domain; and
    prioritizing the existing entry and the new entry by associating a first priority level with the existing entry and a second priority level with the new entry, if there is an existing entry for the received first domain.

2. A method according to claim 1, wherein the receiving the first domain comprises:
  sending a dynamic host configuration protocol request for an option comprising the domain information to a network management entity; and
  receiving a dynamic host configuration protocol option response from the network management entity, the response comprising the first domain and indicating accessibility of the fully qualified domain name corresponding to the first domain.

3. A method according to claim 1, wherein the selecting the domain name server further comprises selecting based at least in part on a priority level associated with one or more of the determined one or more network interfaces.

4. A method according to claim 1, further comprising:
  determining whether the associated one or more network interfaces is open; and
  opening the associated one or more network interfaces, if not already open.

5. An apparatus comprising:
  at least one processor; and
  at least one memory including computer program code, the at least one processor, the at least one memory, and the computer program code configured to cause the apparatus to at least:
    receive a request for resolution of a fully qualified domain name;
    access maintained domain information, wherein the maintained domain information comprises a plurality of domain entries, each domain entry comprising a domain and indicating accessibility of the fully qualified domain name corresponding to the domain over a network interface;
    search the maintained domain information for one or more domain entries corresponding to the fully qualified domain name to determine one or more network interfaces through which the fully qualified domain name is accessible;
    select a domain name server associated with the one or more network interfaces; and
    updating the maintained domain information,
    wherein the updating the maintained domain information comprises:
      receiving a first domain;
      adding a new entry to the maintained domain information comprising the received first domain;
      determining whether there is an existing entry for the received first domain; and
      prioritizing the existing entry and the new entry by associating a first priority level with the existing entry and a second priority level with the new entry, if there is an existing entry for the received first domain.

6. An apparatus according to claim 5, wherein the at least one processor is configured to receive the domain from a network management entity.

7. An apparatus according to claim 5, wherein the at least one processor is configured to receive the first domain by at least:
send a dynamic host configuration protocol request for an option comprising domain information to a network management entity; and
receive a dynamic host configuration protocol option response from the network management entity, the response comprising the first domain and indicating accessibility of the fully qualified domain name corresponding to the first domain.

8. An apparatus according to claim 5, wherein the at least one processor is further configured to select the domain name server based at least in part on a priority level associated with one or more of the determined one or more network interfaces.

9. An apparatus according to claim 8, wherein the priority level comprises an indication of one or more of a trust level associated with the one or more network interfaces, a speed of the one or more network interfaces, or a cost of using the one or more network interfaces.

10. An apparatus according to claim 5, wherein the at least one processor is further configured to at least:
determine whether the associated one or more network interfaces is open; and
open the associated one or more network interfaces, if not already open.

11. A non-transitory computer-readable medium encoded with instructions that, when executed by at least one processor, perform at least the following:
receive a request for resolution of a fully qualified domain name;
access maintained domain information, wherein the maintained domain information comprises a plurality of domain entries, each domain entry comprising a domain and indicating accessibility of the fully qualified domain name corresponding to the domain over a network interface;
search the maintained domain information for one or more domain entries corresponding to the fully qualified domain name to determine one or more network interfaces through which the fully qualified domain name is accessible;
select a domain name server associated with the one or more network interfaces; and
updating the maintained domain information,
wherein the updating the maintained domain information comprises:
receiving a first domain;
adding a new entry to the maintained domain information comprising the received domain;
determining whether there is an existing entry for the received first domain; and
prioritizing the existing entry and the new entry by associating a first priority level with the existing entry and a second priority level with the new entry, if there is an existing entry for the received first domain.

* * * * *

UNITED STATES PATENT AND TRADEMARK OFFICE
CERTIFICATE OF CORRECTION

| | |
|---|---|
| PATENT NO. | : 9,143,389 B2 |
| APPLICATION NO. | : 13/124647 |
| DATED | : September 22, 2015 |
| INVENTOR(S) | : Teemu Ilmari Savolainen |

Page 1 of 1

It is certified that error appears in the above-identified patent and that said Letters Patent is hereby corrected as shown below:

In the Claims – At column 24, claim number 11, line number 21, Should read

"tion comprising the received first domain;"

Signed and Sealed this
Ninth Day of February, 2016

Michelle K. Lee
*Director of the United States Patent and Trademark Office*